(12) United States Patent
Tian

(10) Patent No.: US 10,978,047 B2
(45) Date of Patent: Apr. 13, 2021

(54) METHOD AND APPARATUS FOR RECOGNIZING SPEECH

(71) Applicant: BEIJING BAIDU NETCOM SCIENCE AND TECHNOLOGY CO., LTD., Beijing (CN)

(72) Inventor: Chao Tian, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 127 days.

(21) Appl. No.: 16/254,336

(22) Filed: Jan. 22, 2019

(65) Prior Publication Data

US 2019/0279646 A1 Sep. 12, 2019

(30) Foreign Application Priority Data

Mar. 6, 2018 (CN) .......................... 201810184559.2

(51) Int. Cl.
| | | |
|---|---|---|
| *G10L 15/07* | (2013.01) | |
| *G10L 15/20* | (2006.01) | |
| *G10L 17/14* | (2013.01) | |
| *G10L 15/183* | (2013.01) | |

(Continued)

(52) U.S. Cl.
CPC ............ *G10L 15/07* (2013.01); *G10L 15/183* (2013.01); *G10L 15/20* (2013.01); *G10L 17/14* (2013.01); *G10L 17/00* (2013.01); *G10L 2015/227* (2013.01)

(58) Field of Classification Search
None
See application file for complete search history.

(56) References Cited

U.S. PATENT DOCUMENTS

| | | | | |
|---|---|---|---|---|
| 5,787,230 A * | 7/1998 | Lee | ........................ | G10L 15/063 704/235 |
| 6,067,520 A * | 5/2000 | Lee | ........................ | G10L 15/144 704/231 |

(Continued)

FOREIGN PATENT DOCUMENTS

| | | |
|---|---|---|
| CN | 102013253 A | 4/2011 |
| CN | 103903621 A | 7/2014 |

(Continued)

*Primary Examiner* — Douglas Godbold
(74) *Attorney, Agent, or Firm* — Knobbe Martens Olson & Bear LLP

(57) ABSTRACT

Embodiments of methods and apparatuses for recognizing a speech are provided. An implementation can include: determining an identity of a target user inputting the speech input signal; extracting a common expression set of the target user from a stored common expression database, the common expression set including a plurality of common expressions; extracting an acoustic feature of the speech input signal and input the same into an acoustic model to obtain an acoustic model score; judging whether a content of the speech input signal is a common expression of the target user based on the acoustic model score of the speech input signal and acoustic model scores of the common expressions in the stored common expression set of the target user; and if yes, decoding the acoustic feature of the speech input signal using a language model constructed based on common expressions, to obtain a speech recognition result.

12 Claims, 4 Drawing Sheets

(51) Int. Cl.
*G10L 15/22* (2006.01)
*G10L 17/00* (2013.01)

(56) References Cited

U.S. PATENT DOCUMENTS

| | | | | |
|---|---|---|---|---|
| 7,539,619 | B1* | 5/2009 | Seligman | G10L 15/30 |
| | | | | 704/277 |
| 10,079,015 | B1* | 9/2018 | Lockhart | G10L 15/08 |
| 2006/0020461 | A1* | 1/2006 | Ogawa | G10L 15/04 |
| | | | | 704/251 |
| 2007/0038449 | A1* | 2/2007 | Coifman | G10L 15/065 |
| | | | | 704/243 |
| 2011/0153620 | A1* | 6/2011 | Coifman | G10L 15/065 |
| | | | | 707/748 |
| 2013/0158999 | A1* | 6/2013 | Maruta | G10L 15/10 |
| | | | | 704/252 |
| 2014/0297267 | A1* | 10/2014 | Spencer | G06F 40/274 |
| | | | | 704/9 |
| 2015/0088506 | A1* | 3/2015 | Obuchi | G10L 15/08 |
| | | | | 704/236 |
| 2015/0221301 | A1* | 8/2015 | Zhang | G10L 15/26 |
| | | | | 704/246 |
| 2016/0004773 | A1* | 1/2016 | Jannink | G06F 16/60 |
| | | | | 707/741 |
| 2016/0203819 | A1 | 7/2016 | Ma | |
| 2016/0240188 | A1 | 8/2016 | Seto | |
| 2016/0260426 | A1* | 9/2016 | Kim | G10L 15/05 |
| 2017/0004823 | A1* | 1/2017 | Fukuda | G10L 15/01 |
| 2017/0270919 | A1* | 9/2017 | Parthasarathi | G10L 15/02 |
| 2018/0182386 | A1* | 6/2018 | Lee | G10L 15/22 |
| 2019/0013010 | A1* | 1/2019 | Kokubo | G10L 15/02 |
| 2019/0098249 | A1* | 3/2019 | Naganuma | H04N 5/44513 |
| 2019/0258704 | A1* | 8/2019 | Mertens | G06F 3/167 |
| 2019/0259387 | A1* | 8/2019 | Mertens | G06Q 10/103 |
| 2019/0279629 | A1* | 9/2019 | Okamoto | G10L 15/22 |
| 2020/0043498 | A1* | 2/2020 | Chae | G10L 15/193 |
| 2020/0058298 | A1* | 2/2020 | Ban | G06F 40/284 |

FOREIGN PATENT DOCUMENTS

| | | |
|---|---|---|
| CN | 104778946 A | 7/2015 |
| CN | 105448303 A | 3/2016 |
| CN | 106328124 A | 1/2017 |
| CN | 106384593 A | 2/2017 |
| CN | 107526826 A | 12/2017 |

* cited by examiner

METHOD AND APPARATUS FOR RECOGNIZING SPEECH

CROSS-REFERENCE TO RELATED APPLICATIONS

This application claims priority to Chinese Patent Application No. 201810184559.2, filed in China on Mar. 6, 2018, the content of which is incorporated herein by reference in its entirety.

TECHNICAL FIELD

Embodiments of the present disclosure relate to the field of computer technology, specifically to the field of speech technology, and more specifically to a method and apparatus for recognizing a speech.

BACKGROUND

Artificial intelligence (AI) is a new technical science on research and development of theories, methodologies, technologies and application systems for simulating and extending human intelligence. Artificial intelligence is a branch of computer science, attempts to understand the essence of intelligence and produce a new intelligent machine that may make a response in a manner similar to human intelligence. The research in this field includes robots, speech recognition, image recognition, natural expression processing, expert systems, etc. Speech recognition technology is an important orientation in the field of computer science and artificial intelligence.

Speech recognition usually involves converting speech signals into texts after the front end processing, acoustic model, language model and decoder. During the recognition, it is necessary to search in a library containing a large size of dictionary data, which requires a large amount of calculation and takes a lot of time.

SUMMARY

Embodiments of the present disclosure provide a method and apparatus for recognizing a speech.

In a first aspect, the embodiments of the present disclosure provide a method for recognizing a speech. The method includes: determining, in response to receiving a speech input signal, an identity of a target user inputting the speech input signal; extracting, based on the identity of the target user, a common expression set of the target user from a stored common expression database, the common expression set including a plurality of common expressions; performing acoustic feature extraction on the speech input signal, and inputting an acoustic feature of the speech input signal into an acoustic model to obtain an acoustic model score of the speech input signal; judging whether a content of the speech input signal is a common expression of the target user, based on the acoustic model score of the speech input signal and acoustic model scores of the common expressions in the stored common expression set of the target user; and decoding, in response to the content of the speech input signal is the common expression of the target user, the acoustic feature of the speech input signal using a language model constructed based on common expressions, to obtain a speech recognition result.

In some embodiments, the determining, in response to receiving a speech input signal, an identity of a target user inputting the speech input signal, includes: acquiring, in response to receiving the speech input signal, identifier of an electronic device collecting the speech input signal; and querying the identity of the target user associated with the electronic device based on the identifier of the electronic device collecting the speech input signal.

In some embodiments, the judging whether a content of the speech input signal is a common expression of the target user based on the acoustic model score of the speech input signal and acoustic model scores of the common expressions in the stored common expression set of the target user includes: judging whether the speech input signal is a noise signal, based on the acoustic model score of the speech input signal; and comparing, in response to determining the speech input signal is not a noise signal, the acoustic model score of the speech input signal with the acoustic model scores of the common expressions of the target user, and determining whether the content of the speech input signal is the common expression of the target user based on a comparison result.

In some embodiments, the decoding, in response to the content of the speech input signal is the common expression of the target user, the acoustic feature of the speech input signal using a language model constructed based on common expressions, to obtain a speech recognition result, includes: constructing a state network containing all states in the language model constructed based on common expressions; and finding a path best matching the acoustic feature of the speech input signal from the state network as the recognition result of the speech input signal.

In some embodiments, the method further includes: constructing the common expression database, including: collecting historical speech input signals of users, and converting the historical speech input signals into corresponding texts; clustering historical speech input signals of each of the users based on a consistency between the texts obtained by converting; counting, based on generation time of the historical speech input signals, generation frequencies of the historical speech input signals in each cluster; and determining a historical speech input signal in the cluster having a generation frequency greater than a preset frequency as a common expression speech signal of the user, decoding the common expression speech signal of the user to obtain a syllable sequence, forming a corresponding common expression based on the syllable sequence obtained by decoding, and adding the formed common expression to a common expression set of the user.

In a second aspect, the embodiments of the present disclosure provide an apparatus for recognizing a speech. The apparatus includes: a determination unit, configured to determine, in response to receiving a speech input signal, an identity of a target user inputting the speech input signal; an extraction unit, configured to extract, based on the identity of the target user, a common expression set of the target user from a stored common expression database, the common expression set including a plurality of common expressions; a scoring unit, configured to perform acoustic feature extraction on the speech input signal, and input an acoustic feature of the speech input signal into an acoustic model to obtain an acoustic model score of the speech input signal; a judging unit, configured to judge whether a content of the speech input signal is a common expression of the target user, based on the acoustic model score of the speech input signal and acoustic model scores of the common expressions in the stored common expression set of the target user; and a decoding unit, configured to decode, in response to the content of the speech input signal is the common expression of the target user, the acoustic feature of the speech input signal using a language model constructed based on common expressions to obtain a speech recognition result.

In some embodiments, the determination unit is configured to determine the identity of the target user inputting the speech input signal according to the following: acquire, in response to receiving the speech input signal, identifier of an electronic device collecting the speech input signal; and query the identity of the target user associated with the electronic device based on the identifier of the electronic device collecting the speech input signal.

In some embodiments, the judging unit is configured to judge whether the content of the speech input signal is the common expression of the target user based on the acoustic model score of the speech input signal and the acoustic model scores of the common expressions in the stored common expression set of the target user according to the following: judge whether the speech input signal is a noise signal, based on the acoustic model score of the speech input signal; and compare, in response to determining the speech input signal is not a noise signal, the acoustic model score of the speech input signal with the acoustic model scores of the common expressions of the target user, and determine whether the content of the speech input signal being the common expression of the target user based on a comparison result.

In some embodiments, the decoding unit is configured to decode the acoustic feature of the speech input signal using a language model constructed based on common expressions, to obtain a speech recognition result, according to the following: construct a state network containing all states in the language model constructed based on common expressions; and find a path best matching the acoustic feature of the speech input signal from the state network as the recognition result of the speech input signal.

In some embodiments, the apparatus further includes a construction unit, configured to construct the common expression database; the construction unit is configured to construct the common expression database according to the following: collect historical speech input signals of users, and convert the historical speech input signals into corresponding texts; cluster historical speech input signals of each of the users based on a consistency between the texts obtained by converting; count, based on generation time of the historical speech input signals, generation frequencies of the historical speech input signals in each cluster; and determine a historical speech input signal in the cluster having a generation frequency greater than a preset frequency as a common expression speech signal of the user, decode the common expression speech signal of the user to obtain a syllable sequence, form a corresponding common expression based on the syllable sequence obtained by decoding, and add the formed common expression to a common expression set of the user.

In a third aspect, the embodiments of the present disclosure provide an electronic device, including one or more processors; and a storage apparatus, for storing one or more programs, the one or more programs, when executed by the one or more processors, cause the one or more processors to implement the method for recognizing a speech according to the first aspect of the present disclosure.

In a fourth aspect, the embodiments of the present disclosure provide a computer readable storage medium, storing a computer program thereon, the computer program, when executed by a processor, implements the method for recognizing a speech according to the first aspect of the present disclosure.

By determining, in response to receiving a speech input signal, an identity of a target user inputting the speech input signal; extracting, based on the identity of the target user, a common expression set from the target user in a stored common expression database, the common expression set including a plurality of common expressions; then performing acoustic feature extraction on the speech input signal, and inputting an acoustic feature of the speech input signal into an acoustic model to obtain an acoustic model score of the speech input signal; judging whether a content of the speech input signal is a common expression of the target user, based on the acoustic model score of the speech input signal and acoustic model scores of the common expressions in the stored common expression set of the target user; and if yes, decoding the acoustic feature of the speech input signal using a language model constructed based on common expressions, to obtain a speech recognition result, the method and apparatus for recognizing a speech of the embodiments of the present disclosure achieve an improvement in the speech recognition efficiency.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
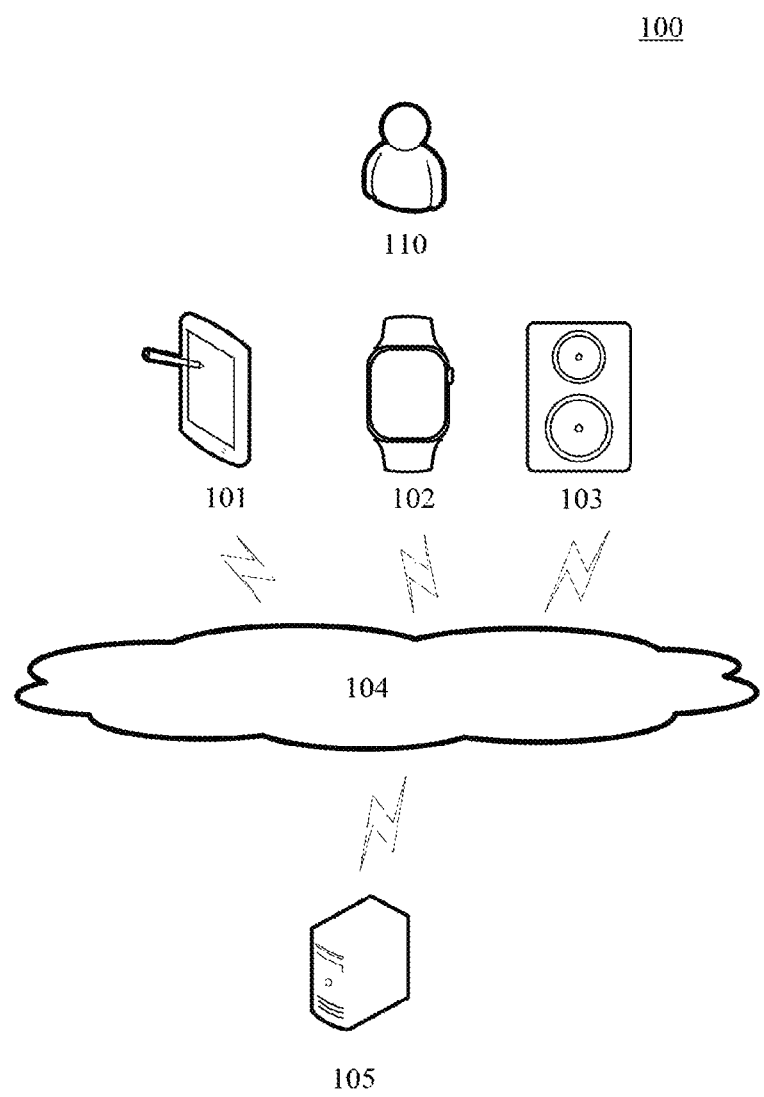
FIG. 1 is an exemplary system architecture diagram to which some embodiments of the present disclosure may be applied.

FIG. 1 shows an exemplary architecture of a system 100 in which a method or an apparatus for recognizing a speech according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network

104 may include various types of connections, such as wired or wireless transmission links, or optical fibers.

The user 110 may use the terminal devices 101, 102 and 103 to interact with the server 105 through the network 104, in order to transmit or receive messages, etc. Various voice interaction applications may be installed on the terminal devices 101, 102 and 103.

The terminal devices 101, 102 and 103 may be various electronic devices having audio input signal and audio output signal and supporting internet access, including but not limited to, smart phones, tablet computers, smart watch, e-book readers, and smart speakers.

The server 105 may be a voice server providing support for the voice service, the voice server may receive the voice interaction request sent by the terminal devices 101, 102 and 103, and analysis the voice interaction request, generate response data based on the analysis result and return the response data to the terminal devices 101, 102 and 103.

It should be noted that the method for recognizing a speech according to the embodiments of the present disclosure may be executed by the terminal devices 101, 102, 103 or the server 105. Accordingly, an speech recognition apparatus may be installed on the terminal devices 101, 102, 103 or the server 105.

It should be appreciated that the numbers of the terminal devices, the networks and the servers in FIG. 1 are merely illustrative. Any number of terminal devices, networks and servers may be provided based on the actual requirements.

Figure 2:
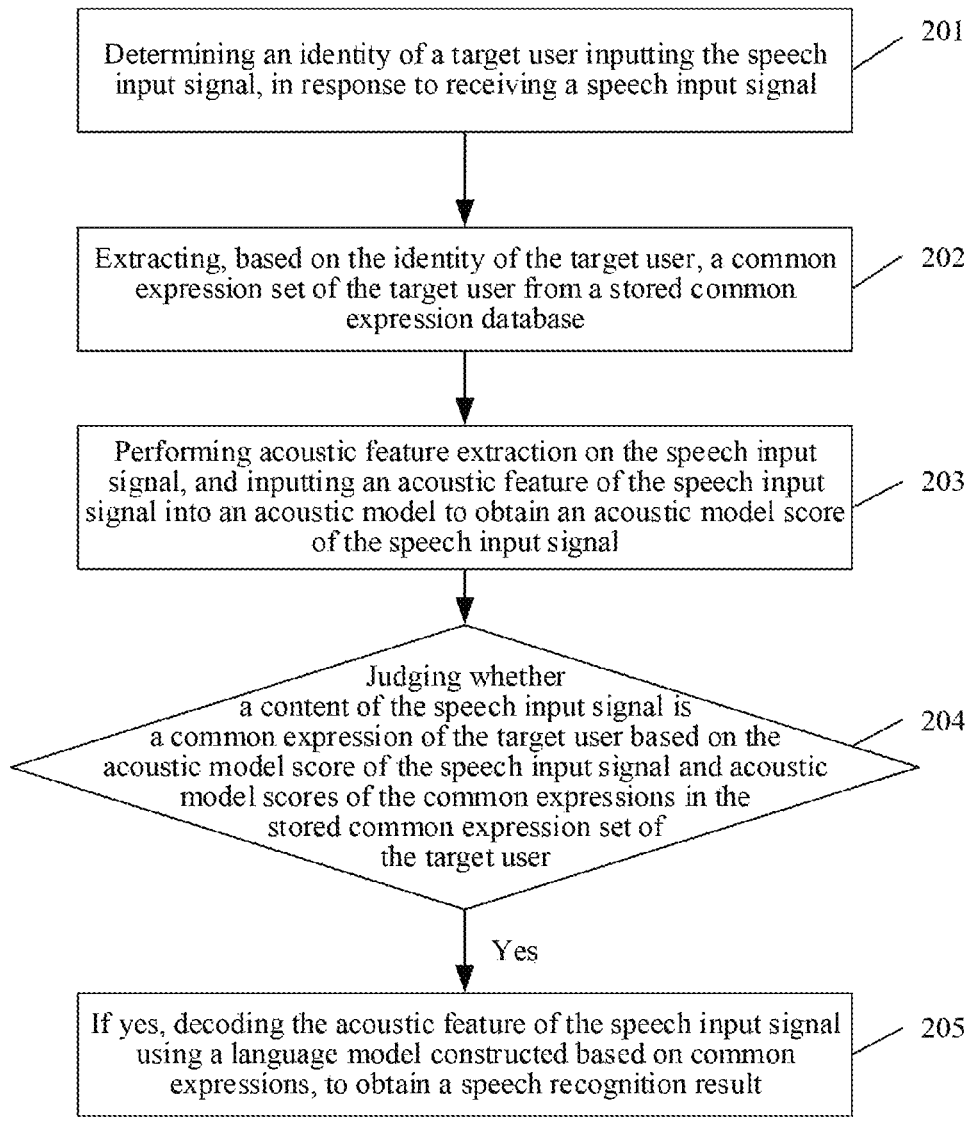
FIG. 2 is a flowchart of an embodiment of a method for recognizing a speech according to the present disclosure.

With further reference to FIG. 2, a flow 200 of an embodiment of a method for recognizing a speech according to the present disclosure is illustrated. The method for recognizing a speech includes the following steps:

Step 201, determining an identity of a target user inputting the speech input signal, in response to receiving a speech input signal.

In the present embodiment, the electronic device (e.g., the terminal devices 101, 102, 103 or the server 105 as shown in FIG. 1) the method for recognizing a speech operates thereon may receive a speech input signal. The speech input signal may be sent by a user to a speech terminal (e.g., the terminal devices 101, 102, 103 as shown in FIG. 1). When the method for recognizing a speech operates on the speech terminal, the speech terminal may receive the speech input signal sent by the user through an audio interface. When the method for recognizing a speech operates on the server connected to the speech terminal, the server may receive the speech input signal transmitted by the speech terminal.

After receiving the speech input signal, the identity of a target user sending the speech input signal may be determined based on the speech input signal. Here, the target user is the user sending the speech input signal.

The identity of the target user may be determined through a variety of approaches. An alternative implementation is to perform voiceprint recognition on the speech input signal, extract the voiceprint feature of the speech input signal, and compare the voiceprint feature with a pre-stored voiceprint feature set of a plurality of users, the user the compared consistent voiceprint feature belongs thereto is the target user sending the speech input signal. The identification of the target user (e.g., the user's account name, etc.) may be acquired as the identity.

In some alternative implementations of the present embodiment, the identity from which the speech input signal is sent may be determined by information about an electronic device that is directly interacting with the user. Specifically, the determining an identity of a target user inputting the speech input signal in response to receiving a speech input signal, may include: acquiring, in response to receiving the speech input signal, identifier of an electronic device collecting the speech input signal; and querying the identity of the target user associated with the electronic device based on the identifier of the electronic device collecting the speech input signal.

Normally, a user uses a fixed electronic device associated with himself for speech interaction, and different users use different electronic devices for speech interaction. For example, the user may use his mobile phone, smart watch, smart speaker placed at home, or the like for sending a speech request. Moreover, the fixed electronic device commonly used by the user may store personal information such as the identity of the associated user. Therefore, the identity of the target user may be determined by the identifier of the device used by the target user. The identifier of the electronic device collecting the speech input signal may be acquired, and the information of the associated user is acquired through the identifier of the electronic device, thereby determining the identity of the target user.

Step 202, extracting, based on the identity of the target user, a common expression set of the target user in a stored common expression database.

Here, the common expression set may include a plurality of common expressions. The common expression is the expression used more frequently. In the present embodiment, the electronic device on which the method for recognizing a speech operates may acquire a common expression database, and the common expression database includes common expression sets of a plurality of users. Then, the common expression set of the target user may be extracted from the common expression database based on the identity of the target user sending the speech input signal.

In an actual scenario, the common expression sets of different users may be different from each other, and the common expressions in the common expression sets of different users may also have intersections. In the present embodiment, the common expressions of the users may be collected to construct the common expression sets of the respective users, and the identities of the respective users are stored in association with their common expression sets in the common expression database. For example, the common expression set of user A includes the common expressions "go home," "go to the company," "how is the weather like" and "news broadcasting," and the common expression set of user B includes the common expressions "hit the gym," "how is the stock market performance," "go home," "check tomorrow's flight to Shanghai" and so on.

The common expressions in the above common expression set may be stored in text and/or audio form, and the common expression set of a user may include a plurality of common expression texts of the user and/or a plurality of common expression audios of the user. In some alternative implementations, the common expressions in the common expression set of a user may be stored in the form of the common expression syllables obtained by inputting the common expression audio of the user into an acoustic model. In this way, after receiving the speech input signal, whether the speech input signal of the user is a common expression is determined by comparing an acoustic model processing result of the speech input signal with the syllables of the common expressions.

Step 203, performing acoustic feature extraction on the speech input signal, and inputting an acoustic feature of the speech input signal into an acoustic model to obtain an acoustic model score of the speech input signal.

Acoustic feature extraction may be performed on the speech input signal, and the time domain feature and frequency domain feature of the speech input signal are extracted by using the approaches such as pitch detection and spectrum analysis. Alternatively, the waveform of the speech input signal may be converted to the Mel scale, and the cepstral analysis may be performed, to extract the MFCC (Mel-Frequency Cepstral Coefficients) feature of the speech input signal. Alternatively, a perceptual linear predictive method may be used to extract the perceptual linear prediction coefficient feature of the speech input signal.

Then, the extracted acoustic feature of the speech input signal may be input into the acoustic model for acoustic scoring. Here, the acoustic model may be a model constructed based on HMM (Hidden Markov Model), GMM-HMM (Gaussian Mixed Model-Hidden Markov Model), or depth neural network. The acoustic model may model the acoustic feature to obtain acoustic model scores of the speech input signal. Here, the acoustic model scores of the speech input signal may be the probabilities of the syllables included in the speech input signal.

The acoustic model may be pre-trained based on annotated sample data. Specifically, syllables included in a sample speech signal may be annotated, acoustic feature of the sample speech signal is extracted and input into the acoustic model. Comparing the acoustic score prediction result of the acoustic model on the sample speech signal with the annotation result of the sample speech signal, continuously adjusting the parameters of the acoustic model to cause the prediction result of the acoustic model approximates the annotation result, when the difference between the prediction result and the annotation result is less than a preset threshold, the adjusting of the parameters of the acoustic model is stopped and a trained acoustic model is obtained.

Step 204, judging whether a content of the speech input signal is a common expression of the target user based on the acoustic model score of the speech input signal and acoustic model scores of the common expressions in the stored common expression set of the target user.

In the present embodiment, the acoustic model scores of the common expressions in the common expression set may be pre-stored. Acoustic features of the audios of each of the common expressions may be extracted and input into the acoustic model to predict the probability distribution of each syllable in the audios of the common expressions, that is, obtaining the acoustic model scores of each of the common expressions, and storing the acoustic model scores of each of the common expressions.

After extracting the common expression set of the target user, the acoustic model scores of the common expressions in the stored common expression set of the target user may be obtained, and then the acoustic model score of the speech input signal is compared with the acoustic model scores of the common expressions in the common expression set of the target user, that is, the probability distribution of the syllables included in the speech input signal and the probability distribution of the syllables included in the stored common expression audios of the target user, if the consistence between the two meets a preset condition, then it is determined that the content of the speech input signal is a common expression of the target user, otherwise it may be determined that the content of the speech input signal is not the common expression of the target user.

In some embodiments, when judging whether the received speech input signal is a common expression, it may first be detected that whether the speech input signal is a noise signal. The noise signal here may be ambient noise. Specifically, the judging whether a content of the speech input signal is a common expression of the target user based on the acoustic model score of the speech input signal and acoustic model scores of the common expressions in the stored common expression set of the target user may include: judging whether the speech input signal is a noise signal based on the acoustic model score of the speech input signal; and comparing, in response to determining the speech input signal is not a noise signal, the acoustic model score of the speech input signal with the acoustic model scores of the common expressions of the target user, and determining whether the content of the speech input signal is the common expression of the target user based on a comparison result.

Since the noise signal is different from the human speech signal in sound generation, the time and frequency characteristics of the noise signal differ greatly from the time and frequency characteristics of the speech signal produced by a person. However, the acoustic model is usually based on the time domain feature and/or frequency domain feature of each of the syllables in the acoustic dictionary to analyze the syllable probability distribution of the speech signal, so that the acoustic score (probability of that each frame in the noise signal corresponds to one or more syllables) of the noise signal usually is low, that is, the acoustic model score of the noise signal is much lower than the acoustic model score of a speech signal produced by a person.

The electronic device on which the method for recognizing a speech operates may determine whether an input signal is a noise signal based on whether the acoustic model score of the speech input signal is lower than a preset score threshold. If yes, the speech input signal is determined as a noise signal, otherwise the speech input signal may be determined as the speech signal sent by the target user.

When it is determined that the speech input signal is not a noise, the acoustic model score of the speech input signal may be compared with the acoustic model scores of the common expressions in the common expression set of the target user to determine whether there is a common expression in the common expression set of the target user which has a difference from the acoustic model score of the speech input signal less than a preset difference value. If yes, the content of the speech input signal may be determined as a common expression of the target user. Alternatively, if there is no common expression in the common expression set of the target user having the difference from the acoustic model score of the speech input signal less than the preset difference value, it may be determined that the content of the speech input signal is not the common expression of the target user.

Step 205, decoding, in response to the content of the speech input signal is the common expression of the target user, the acoustic feature of the speech input signal using a language model constructed based on common expressions, to obtain a speech recognition result.

In the present embodiment, the electronic device on which the method for recognizing a speech operates may decode the acoustic feature of the speech input signal using a language model constructed based on common expressions. Here, the language model constructed based on common expressions may use the collected common expressions of a large number of users to construct a dictionary and grammatical logic. When decoding, the expressions in the dictionary constructed based on the common expression may be combined in all possible ways according to the grammatical logic to form a text sequence set containing a plurality of text sequences, and then a text sequence of the highest probability in matching the speech input signal may be found in the text sequence set.

Specifically, when searching for the text sequence of the highest probability in matching the speech input signal, the acoustic model may be used to process the acoustic feature of the speech input signal to obtain a pronunciation decomposition result of the speech input signal including the probability of each of the syllables, and then a decoding model constructed based on, such as, the N-gram model, the convolutional neural network, or the cyclic neural network may be used to calculate the probabilities of the text content corresponding to the pronunciation decomposition result of the speech input signal being each of the text sequences, and finally the text sequence of the highest probability is selected as the speech recognition result.

In some alternative implementations of the present embodiment, the language model constructed based on common expressions may be used to decode the acoustic feature of the speech input signal to obtain a speech recognition result according to the following: constructing a state network containing all states in the language model constructed based on common expressions; and finding a path best matching the acoustic feature of the speech input signal from the state network as the recognition result of the speech input signal.

Specifically, the state network may be constructed using a hidden Markov model. Each N (N is a positive integer) state in the state network constitutes a phoneme, one or more phonemes constitute a syllable, one or more syllables constitute a word, and one or more words form a text sequence. In the present embodiment, a plurality of text sequences may be constructed based on collected common expressions, and then the text sequences are decomposed into words, the words are decomposed into syllables, the syllables are decomposed into phonemes, and the phonemes are decomposed into states in the state network. In this way, a state network that includes a sequence of states corresponding to the text sequences corresponding to all the common expressions may be constructed, and in the state network, the sequence of states hit by each text sequence forms a path, and the state network has a plurality of paths. The path that best matches the acoustic feature of the speech input signal may be found from the state network, and specifically, the probabilities of that a frame in the speech input signal corresponds to each of the states may be calculated, and the path having the highest probability and satisfying the grammatical logic of the common expression may be selected as the decoding result of the speech input signal. Finally, the text sequence corresponding to the path having the highest probability may be obtained, that is, as the recognition result of the speech input signal.

In the present embodiment, the speech input signal is decoded using a language model constructed based on common expressions, since the data of the dictionary and grammatical logic of the common expressions is much smaller than the data of the dictionary and grammatical logic including all the words in the language system, the amount of calculation may be greatly reduced, and the calculation efficiency is improved.

In some alternative implementations of the present embodiment, the method for recognizing a speech may further include the step of constructing the common expression database. The step of constructing the common expression database may include: constructing a common expression set for each user.

Specifically, for each user, historical speech input signals of the user may be collected first, and the historical speech input signals are converted into corresponding texts. That is, the historical speech input signals of the user may be collected during the historical speech interaction with the user, and the conventional speech recognition method may be used for recognition, and converting the historical speech input signals into texts.

The historical speech input signals of each user may then be clustered based on the consistency between the texts obtained by converting. Feature extraction may be performed on the texts obtained by converting, and the similarity between the features of the texts is calculated as measurement parameter of the consistency between the texts, the texts with higher consistency are clustered into a same cluster; or the texts obtained by converting may be paired for comparison, the consistent ones are clustered into a same cluster, and the inconsistent ones are divided into different clusters.

Then, according to the generation time of the historical speech input signals, the generation frequencies of the historical speech input signals in each cluster may be counted. The generation time of a historical speech input signal may be obtained, that is, the time when the user sends the historical speech input signal, and then the numbers of times of the user sending all the speech input signals in a cluster within a preset time period (for example, within six months before the counting time) may be counted, the frequencies at which the user sends the historical speech input signals in the cluster is calculated as the generation frequencies of the historical speech input signals of the cluster.

Then, the historical speech input signal in the cluster with the generation frequency greater than a preset frequency may be used as the common expression speech signal of the user, and the common expression speech signal of the user is decoded to obtain a syllable sequence. A corresponding common expression is formed based on the syllable sequence obtained by decoding, and the formed common expression is added to the common expression set of the user. Specifically, a historical speech input signal in the cluster with the generation frequency greater than the preset frequency is a speech signal that is frequently sent by the user, and may be used as the common expression speech signal of the user, and then an acoustic feature (such as MFCC) based extraction method is used to extract the feature of the common expression speech signal of the user. The feature based on the common expression speech signal is decoded to obtain the probability of each syllable in the common expression speech signal. The syllable sequence obtained after decoding the common expression may be determined according to the probability of each syllable. For example, the probability maximum value may be selected as the syllable obtained by decoding, and all syllables of the common expression are sequentially arranged to form the syllable sequence. The syllable sequence obtained by parsing each common expression speech signal may be used as the common expression and added to the common expression set of the corresponding user. Here, the probability of each syllable in the syllable sequence may be the acoustic model score of the common expression, and the syllable sequence of the common expression may be stored in association with the corresponding acoustic model score.

Figure 3:
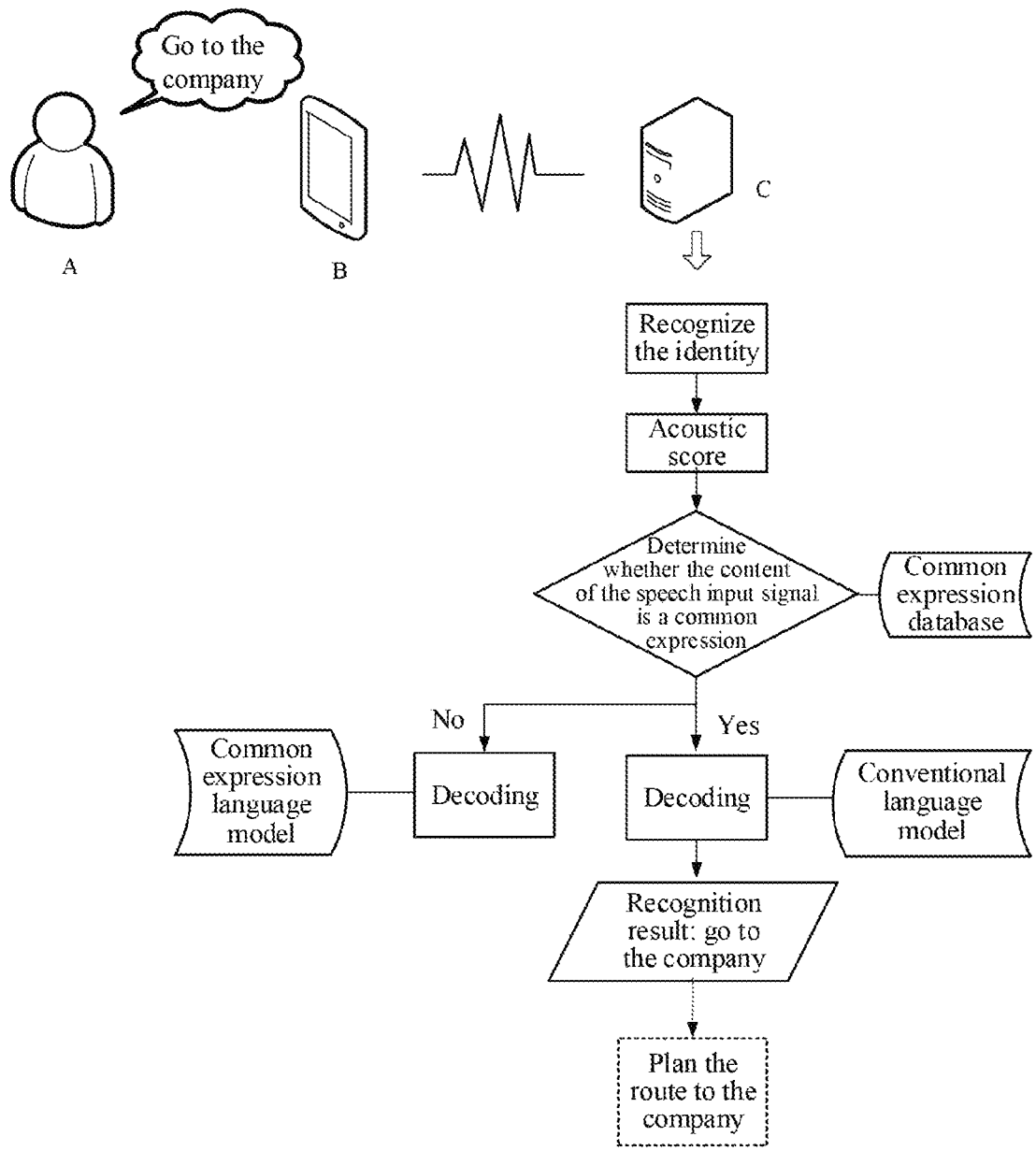
FIG. 3 is a schematic diagram of an application scenario of the method for recognizing a speech according to some embodiments of the present disclosure.

Referring to FIG. 3, which shows a schematic diagram of an application scenario of the method for recognizing a speech according to some embodiments of the present disclosure. As shown in FIG. 3, user A sends a speech command containing the content "go to the company" to the mobile phone B, and the mobile phone B converts the speech command into a speech input signal and transmits it to the server C. After receiving the speech input signal, the server C may recognize the identity of the user A according to the device number of the mobile phone B, then acoustically score the speech input signal to obtain an acoustic model score of the speech input signal, and then use the common expression set extracted based on the identity of the user A from the common expression database to determine whether the content of the speech input signal is a common expression. If the content of the speech input signal is a common expression, the common expression model is used for decoding; if the content of the speech input signal is not a common expression, the conventional language model is used for decoding. In this scenario, when the content of the speech input signal is determined as a common expression, a common expression language model with a small data size and less calculation amount may be used for decoding, and the obtained speech recognition result is: go to the company. In the actual scenario, the server C may respond according to the speech recognition result, for example, the route to the company may be planned, and the planned route is sent to the mobile phone B.

The method for recognizing a speech of the embodiments of the present disclosure determines an identity of a target user inputting the speech input signal, in response to receiving a speech input signal, then extracts, based on the identity of the target user, a common expression set of the target user in a stored common expression database, the common expression set including a plurality of common expressions, then performs acoustic feature extraction on the speech input signal, and inputs an acoustic feature of the speech input signal into an acoustic model to obtain an acoustic model score of the speech input signal, judges whether a content of the speech input signal is a common expression of the target user based on the acoustic model score of the speech input signal and acoustic model scores of the common expressions in the stored common expression set of the target user, and if yes, decodes the acoustic feature of the speech input signal using a language model constructed based on common expressions to obtain a speech recognition result. Since the data size of the language model constructed based on common expressions is small, the decoding takes less time, the method for recognizing a speech of the embodiments of the present disclosure may effectively improve the speech recognition efficiency.

Figure 4:
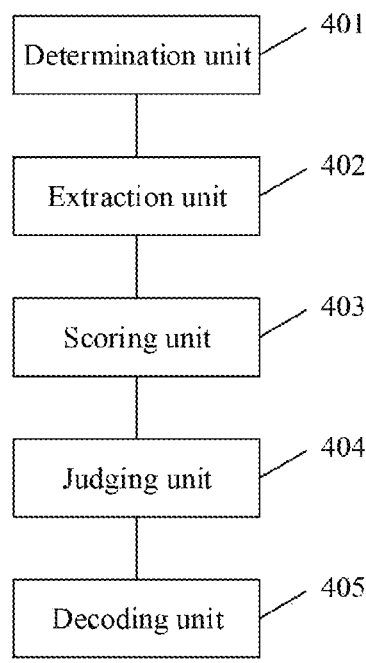
FIG. 4 is a schematic structural diagram of an embodiment of an apparatus for recognizing a speech according to the present disclosure.

With further reference to FIG. 4, as an implementation to the method shown in the above figures, the present disclosure provides an embodiment of an apparatus for recognizing a speech. The apparatus embodiment corresponds to the method embodiment shown in FIG. 2, and the apparatus may specifically be applied to various electronic devices.

As shown in FIG. 4, the apparatus 400 for recognizing a speech of the present embodiment includes: a determination unit 401, an extraction unit 402, a scoring unit 403 and a judging unit 404 and a decoding unit 405. The determination unit 401 may be configured to determine, in response to receiving a speech input signal, an identity of a target user inputting the speech input signal. The extraction unit 402 may be configured to extract, based on the identity of the target user, a common expression set of the target user from a stored common expression database, the common expression set including a plurality of common expressions. The scoring unit 403 may be configured to perform acoustic feature extraction on the speech input signal, and input an acoustic feature of the speech input signal into an acoustic model to obtain an acoustic model score of the speech input signal. The judging unit 404 may be configured to judge whether a content of the speech input signal is a common expression of the target user, based on the acoustic model score of the speech input signal and acoustic model scores of the common expressions in the stored common expression set of the target user. The decoding unit 405 may be configured to decode, in response to the content of the speech input signal is the common expression of the target user, the acoustic feature of the speech input signal using a language model constructed based on common expressions to obtain a speech recognition result.

In the present embodiment, the determination unit 401 may receive a speech input signal, and determine the identity of the target user sending the speech input signal through a variety of approaches. For example, a voiceprint recognition method may be used to perform feature extraction on the speech input signal, and the extracted feature is matched with the voiceprint features in a pre-stored voiceprint feature set of a plurality of users. The user corresponding to the successfully matched voiceprint feature is the target user, and then the identity of the target user is determined.

The extraction unit 402 may acquire a common expression database including common expression sets of a plurality of users, and each common expression set is associated with the identity of the user. The extraction unit 402 may extract the common expression set of the target user from the common expression database based on the identity of the target user determined by the determination unit 401.

The scoring unit 403 may perform acoustic feature extraction on the speech input signal, extract time domain and/or frequency domain features of the speech input signal by using a method such as pitch detection, or spectrum analysis, and then input the extracted acoustic feature into the acoustic model for scoring. The acoustic model may be a model constructed based on an HMM or a deep neural network, and the acoustic feature may be modeled to obtain the probability of each syllable included in the speech input signal, i.e., obtaining the acoustic model score.

The judging unit 404 may acquire the stored acoustic model scores of the common expressions in the common expression set of the target user extracted by the extraction unit 402, and then compare the acoustic model score of the speech input signal with the acoustic model scores of the common expressions in the common expression set of the target user, if the consistence between the two meets a preset condition, then it is determined that the content of the speech input signal is a common expression of the target user, otherwise it is determined that the content of the speech input signal is not the common expression of the target user.

When the judging result of the judging unit 404 is that the content of the speech input signal is a common expression of the target user, the decoding unit 405 may calculate the probability of the text content corresponding to the pronunciation decomposition result of the speech input signal being each of the text sequences using a decoding model such as the N-gram model constructed based on common expressions, the convolutional neural network, or the cyclic neural network, and finally the text sequence having the highest probability is selected as the result of the speech recognition.

In some embodiments, the determination unit 401 may be further configured to determine the identity of the target user inputting the speech input signal according to the following: acquire, in response to receiving the speech input signal, identifier of an electronic device collecting the speech input signal; and query the identity of the target user associated with the electronic device based on the identifier of the electronic device collecting the speech input signal.

In some embodiments, the judging unit 404 may be further configured to determine whether the content of the speech input signal is the common expression of the target user based on the acoustic model score of the speech input signal and the acoustic model scores of the common expressions in the stored common expression set of the target user according to the following: determine whether the speech input signal is a noise signal based on the acoustic model score of the speech input signal; and compare, in response to determining the speech input signal is not a noise signal, the acoustic model score of the speech input signal with the acoustic model scores of the common expressions of the target user, and determine whether the content of the speech input signal being the common expression of the target user based on a comparison result.

In some embodiments, the decoding unit 405 may be further configured to decode the acoustic feature of the speech input signal using a language model constructed based on common expressions to obtain a speech recognition result according to the following: construct a state network containing all states in the language model constructed based on common expressions; and find a path best matching the acoustic feature of the speech input signal from the state network as the recognition result of the speech input signal.

In some embodiments, the apparatus 400 may further include a construction unit, configured to construct the common expression database. The construction unit is configured to construct the common expression database according to the following: collect historical speech input signals of users, and convert the historical speech input signals into corresponding texts; cluster historical speech input signals of each of the users based on a consistency between the texts obtained by converting; count generation frequencies of the historical speech input signals in each cluster based on generation time of the historical speech input signals; and determine a historical speech input signal in the cluster having a generation frequency greater than a preset frequency as a common expression speech signal of the user, decode the common expression speech signal of the user to obtain a syllable sequence, form a corresponding common expression based on the syllable sequence obtained by decoding, and add the formed common expression to a common expression set of the user.

The units described in the apparatus 400 correspond to the various steps in the method described with reference to FIG. 2. Thus, the operations and features described above for the method are equally applicable to the apparatus 400 and the units contained therein, and detailed descriptions thereof will be omitted.

In the apparatus 400 for recognizing a speech of the embodiments of the present disclosure, the determination unit determines an identity of a target user inputting the speech input signal, in response to receiving a speech input signal; then the extraction unit extracts, based on the identity of the target user, a common expression set of the target user in a stored common expression database, the common expression set including a plurality of common expressions; then the scoring unit performs acoustic feature extraction on the speech input signal, and inputs an acoustic feature of the speech input signal into an acoustic model to obtain an acoustic model score of the speech input signal; the judging unit judges whether a content of the speech input signal is a common expression of the target user based on the acoustic model score of the speech input signal and acoustic model scores of the common expressions in the stored common expression set of the target user; and finally the decoding unit decodes the acoustic feature of the speech input signal using a language model constructed based on common expressions to obtain a speech recognition result, in response to determining the content of the speech input signal being the common expression of the target user. The apparatus 400 achieves an improvement in the speech recognition efficiency.

Figure 5:
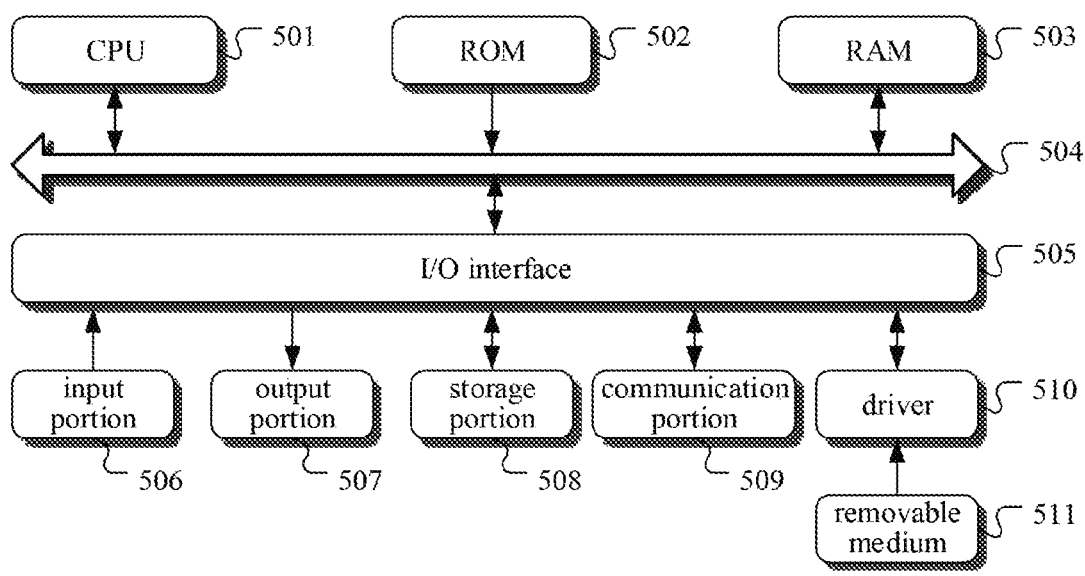
FIG. 5 is a schematic structural diagram of a computer system adapted to implement a server of the embodiments of the present disclosure.

Referring to FIG. 5, a schematic structural diagram of a computer system 500 adapted to implement an electronic device of the embodiments of the present disclosure is shown. The electronic device shown in FIG. 5 is merely an example and should bring any limitation on the functionality and usage range of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504. The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is embedded in a machine-readable medium. The computer program comprises program codes for executing the method as illustrated in the flow chart. In such an embodiment, the computer program may be downloaded and installed from a network via the communication portion X09, and/or may be installed from the removable media X11. The computer program, when executed by the central processing unit (CPU) X01, implements the above mentioned functionalities as defined by the methods of some embodiments of the present disclosure. It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in some embodiments of the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a determination unit, a extraction unit, a scoring unit, a judging unit and a decoding unit, where the names of these units or modules do not in some cases constitute a limitation to such units or modules themselves. For example, the determination unit may also be described as "a unit for determining, in response to receiving a speech input signal, an identity of a target user inputting the speech input signal."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: determining, in response to receiving a speech input signal, an identity of a target user inputting the speech input signal; extracting, based on the identity of the target user, a common expression set of the target user from a stored common expression database, the common expression set comprising a plurality of common expressions; performing acoustic feature extraction on the speech input signal, and inputting an acoustic feature of the speech input signal into an acoustic model to obtain an acoustic model score of the speech input signal; judging whether a content of the speech input signal is a common expression of the target user, based on the acoustic model score of the speech input signal and acoustic model scores of the common expressions in the stored common expression set of the target user; and decoding, in response to the content of the speech input signal is the common expression of the target user, the acoustic feature of the speech input signal using a language model constructed based on common expressions, to obtain a speech recognition result.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for recognizing a speech, the method comprising:
   determining, in response to receiving a speech input signal, an identity of a target user inputting the speech input signal;
   extracting, based on the identity of the target user, a common expression set of the target user from a stored common expression database, the common expression set comprising a plurality of common expressions;
   performing acoustic feature extraction on the speech input signal, and inputting an acoustic feature of the speech input signal into an acoustic model to obtain an acoustic model score of the speech input signal;
   determining whether a content of the speech input signal is a common expression of the target user, based on the acoustic model score of the speech input signal and acoustic model scores of the common expressions in the stored common expression set of the target user, wherein determining whether the content of the speech input signal is the common expression comprises: determining whether a difference between the acoustic model score of the speech input signal with the acoustic model scores of the common expressions in the stored common expression set of the target user does not satisfy a threshold; and decoding, in response to the content of the speech input signal is the common expression of the target user, the acoustic feature of the speech input signal using a language model constructed based on common expressions, to obtain a speech recognition result, wherein the method is performed by at least one hardware processor.

2. The method according to claim 1, wherein the determining, in response to receiving a speech input signal, an identity of a target user inputting the speech input signal, comprises:

acquiring, in response to receiving the speech input signal, identifier of an electronic device collecting the speech input signal; and querying the identity of the target user associated with the electronic device based on the identifier of the electronic device collecting the speech input signal.

3. The method according to claim 1, wherein the determining whether a content of the speech input signal is a common expression of the target user based on the acoustic model score of the speech input signal and acoustic model scores of the common expressions in the stored common expression set of the target user comprises:

determining whether the speech input signal is a noise signal, based on the acoustic model score of the speech input signal; and comparing, in response to determining the speech input signal is not a noise signal, the acoustic model score of the speech input signal with the acoustic model scores of the common expressions of the target user, and determining whether the content of the speech input signal is the common expression of the target user based on a comparison result.

4. The method according to claim 1, wherein the decoding, in response to the content of the speech input signal is the common expression of the target user, the acoustic feature of the speech input signal using a language model constructed based on common expressions, to obtain a speech recognition result, comprises:

constructing a state network containing all states in the language model constructed based on common expressions; and finding a path best matching the acoustic feature of the speech input signal from the state network as the recognition result of the speech input signal.

5. The method according to claim 1, the method further comprising:

constructing the common expression database, comprising:

collecting historical speech input signals of users, and converting the historical speech input signals into corresponding texts;

clustering historical speech input signals of each of the users based on a consistency between the texts obtained by converting;

counting, based on generation time of the historical speech input signals, generation frequencies of the historical speech input signals in each cluster; and determining a historical speech input signal in the cluster having a generation frequency greater than a preset frequency as a common expression speech signal of the user, decoding the common expression speech signal of the user to obtain a syllable sequence, forming a corresponding common expression based on the syllable sequence obtained by decoding, and adding the formed common expression to a common expression set of the user.

6. The method according to claim 1, wherein the acoustic model score of the speech input signal indicates a probability that a frame of the speech input signal corresponds to one or more syllables, and wherein the method further comprises determining that the frame is not a noise signal based on the acoustic model score of the speech input signal.

7. An apparatus for recognizing a speech, the apparatus comprising:

at least one processor; and a memory storing instructions, the instructions when executed by the at least one processor, cause the at least one processor to perform operations, the operations comprising:

determining, in response to receiving a speech input signal, an identity of a target user inputting the speech input signal;

extracting, based on the identity of the target user, a common expression set of the target user from a stored common expression database, the common expression set comprising a plurality of common expressions;

performing acoustic feature extraction on the speech input signal, and input an acoustic feature of the speech input signal into an acoustic model to obtain an acoustic model score of the speech input signal;

determining whether a content of the speech input signal is a common expression of the target user, based on the acoustic model score of the speech input signal and acoustic model scores of the common expressions in the stored common expression set of the target user, wherein determining whether the content of the speech input signal is the common expression comprises: determining whether a difference between the acoustic model score of the speech input signal with the acoustic model scores of the common expressions in the stored common expression set of the target user does not satisfy a threshold; and decoding, in response to the content of the speech input signal is the common expression of the target user, the acoustic feature of the speech input signal using a language model constructed based on common expressions, to obtain a speech recognition result.

8. The apparatus according to claim 7, wherein the determining, in response to receiving a speech input signal, an identity of a target user inputting the speech input signal, comprises:

acquiring, in response to receiving the speech input signal, identifier of an electronic device collecting the speech input signal; and querying the identity of the target user associated with the electronic device based on the identifier of the electronic device collecting the speech input signal.

9. The apparatus according to claim 7, wherein the determining whether a content of the speech input signal is a common expression of the target user based on the acoustic model score of the speech input signal and acoustic model scores of the common expressions in the stored common expression set of the target user comprises:

determining whether the speech input signal is a noise signal, based on the acoustic model score of the speech input signal; and comparing, in response to determining the speech input signal is not a noise signal, the acoustic model score of the speech input signal with the acoustic model scores of the common expressions of the target user, and determine whether the content of the speech input signal is the common expression of the target user based on a comparison result.

10. The apparatus according to claim 7, wherein the decoding, in response to the content of the speech input signal is the common expression of the target user, the acoustic feature of the speech input signal using a language model constructed based on common expressions, to obtain a speech recognition result, comprises:

constructing a state network containing all states in the language model constructed based on common expressions; and finding a path best matching the acoustic feature of the speech input signal from the state network as the recognition result of the speech input signal.

11. The apparatus according to claim 7, wherein the operations further comprise:

constructing the common expression database, comprising:

collecting historical speech input signals of users, and convert the historical speech input signals into corresponding texts;

clustering historical speech input signals of each of the users based on a consistency between the texts obtained by converting;

counting, based on generation time of the historical speech input signals, generation frequencies of the historical speech input signals in each cluster; and determining a historical speech input signal in the cluster having a generation frequency greater than a preset frequency as a common expression speech signal of the user, decode the common expression speech signal of the user to obtain a syllable sequence, form a corresponding common expression based on the syllable sequence obtained by decoding, and add the formed common expression to a common expression set of the user.

12. A non-transitory computer readable storage medium storing a computer program, wherein the computer program, when executed by a processor, cause the processor to perform operations, the operations comprising:

determining, in response to receiving a speech input signal, an identity of a target user inputting the speech input signal;

extracting, based on the identity of the target user, a common expression set of the target user from a stored common expression database, the common expression set comprising a plurality of common expressions;

performing acoustic feature extraction on the speech input signal, and inputting an acoustic feature of the speech input signal into an acoustic model to obtain an acoustic model score of the speech input signal;

determining whether a content of the speech input signal is a common expression of the target user, based on the acoustic model score of the speech input signal and acoustic model scores of the common expressions in the stored common expression set of the target user, wherein determining whether the content of the speech input signal is the common expression comprises: determining whether a difference between the acoustic model score of the speech input signal with the acoustic model scores of the common expressions in the stored common expression set of the target user does not satisfy a threshold; and decoding, in response to the content of the speech input signal is the common expression of the target user, the acoustic feature of the speech input signal using a language model constructed based on common expressions, to obtain a speech recognition result.

* * * * *